June 11, 1963     S. BUKATA     3,093,104
FURNACE
Filed June 27, 1958     4 Sheets-Sheet 1
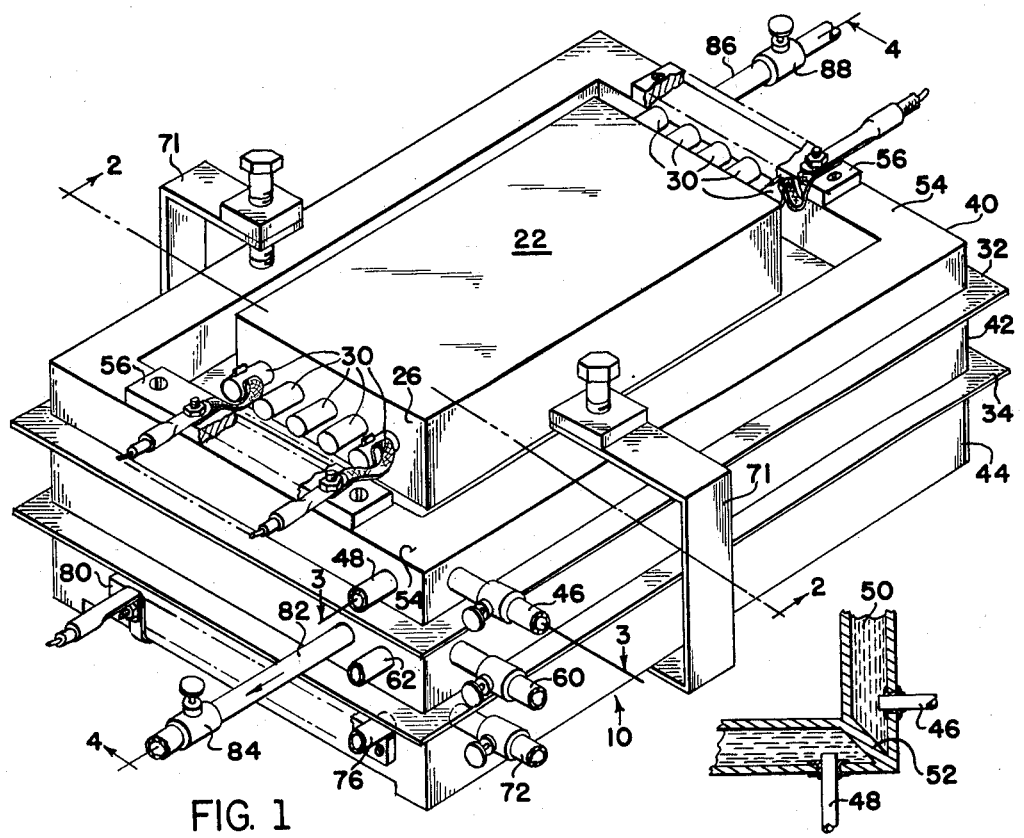
FIG. 1
FIG. 3
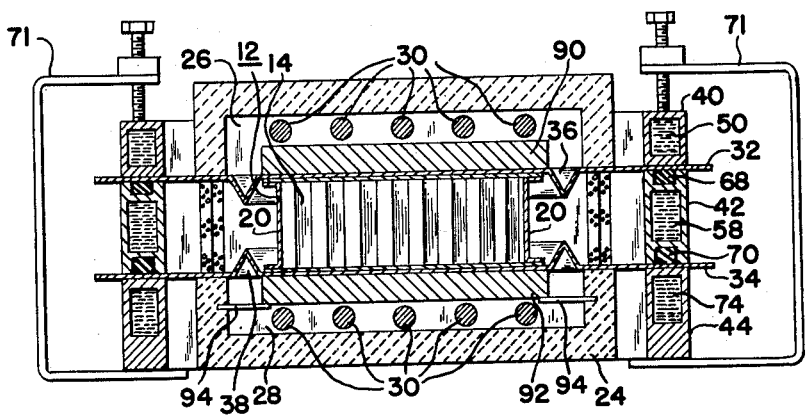
FIG. 2
INVENTOR.
STEPHEN BUKATA
BY Arthur H. Seidel
ATTORNEY June 11, 1963 S. BUKATA 3,093,104
FURNACE
Filed June 27, 1958 4 Sheets-Sheet 2

INVENTOR.
STEPHEN BUKATA
BY
Arthur H. Seidel
ATTORNEY

June 11, 1963  S. BUKATA  3,093,104
FURNACE

Filed June 27, 1958  4 Sheets-Sheet 3

INVENTOR.
STEPHEN BUKATA
BY Arthur H. Seidel
ATTORNEY

INVENTOR.
STEPHEN BUKATA
BY Arthur H. Seidel
ATTORNEY

United States Patent Office 3,093,104
Patented June 11, 1963

3,093,104
FURNACE
Stephen Bukata, 7813 Ardleigh St., Philadelphia, Pa.
Filed June 27, 1958, Ser. No. 745,129
3 Claims. (Cl. 113—99)

The present invention is directed to a furnace, and more particularly to a furnace for brazing sandwich panels comprising a honeycomb or like core disposed intermediate cover sheets.

The need for structural materials which have high strength-to-weight ratios and remain structurally sound at elevated temperatures has resulted in a concentrated effort to develop stainless steel, or titanium, or like metal sandwich structures. Such sandwich structures have excellent fatigue characteristics under extreme conditions of heat, vibration, and sound, so that they comprise preferred constructional materials for high speed aircraft and missiles.

Unfortunately, the cost of manufacture of sandwich structures by conventional techniques is very great. At the present time, many forms of sandwich panels have a cost of a thousand dollars per cubic foot and more.

An appreciable part of the cost of sandwich structures lies in the cost of brazing the core to the cover sheets and to the edge members. Particularly is this the case where the metallurgical considerations affecting the braze require that the brazing be done under vacuum conditions, or in a selected closely controlled atmosphere, such as an atmosphere comprising an inert gas. At the present time, brazing operations of the aforesaid type are effected using welded envelopes which are expensive to construct, and which must be cut open to effect removal of the sandwich structure.

This invention has as an object the provision of a new furnace.

This invention has as another object the provision of a furnace for brazing sandwich assemblies.

This invention has as yet another object the provision of a furnace in which brazing may be effected under closely controlled atmospheric conditions including high vacuum conditions.

Other objects will appear hereinafter.

For the purpose of illustrating the invention there is shown in the drawings forms which are presently preferred; it being understood, however, that this invention is not limited to the precise arrangements and instrumentalities shown.

Referring to the drawings wherein like reference characters refer to like parts:

FIGURE 1 is a perspective view of one embodiment of the furnace of the present invention.

FIGURE 2 is a sectional view taken on line 2—2 of FIGURE 1.

FIGURE 3 is a sectional view taken on line 3—3 of FIGURE 1.

Figure 4:
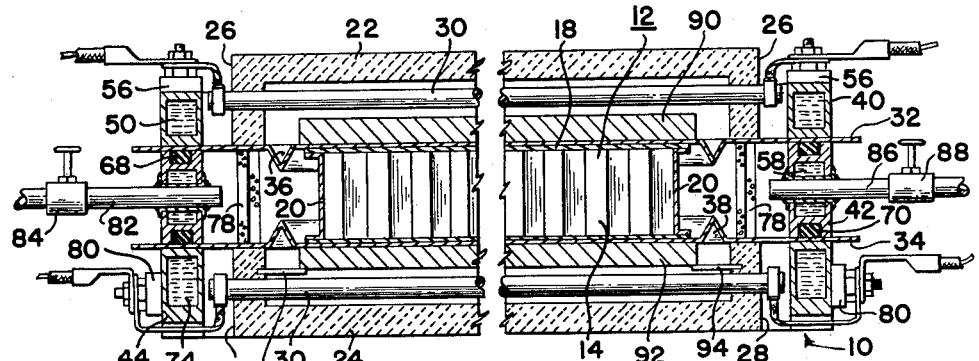
FIGURE 4 is a sectional view taken on line 4—4 of FIGURE 1.
Figure 5:
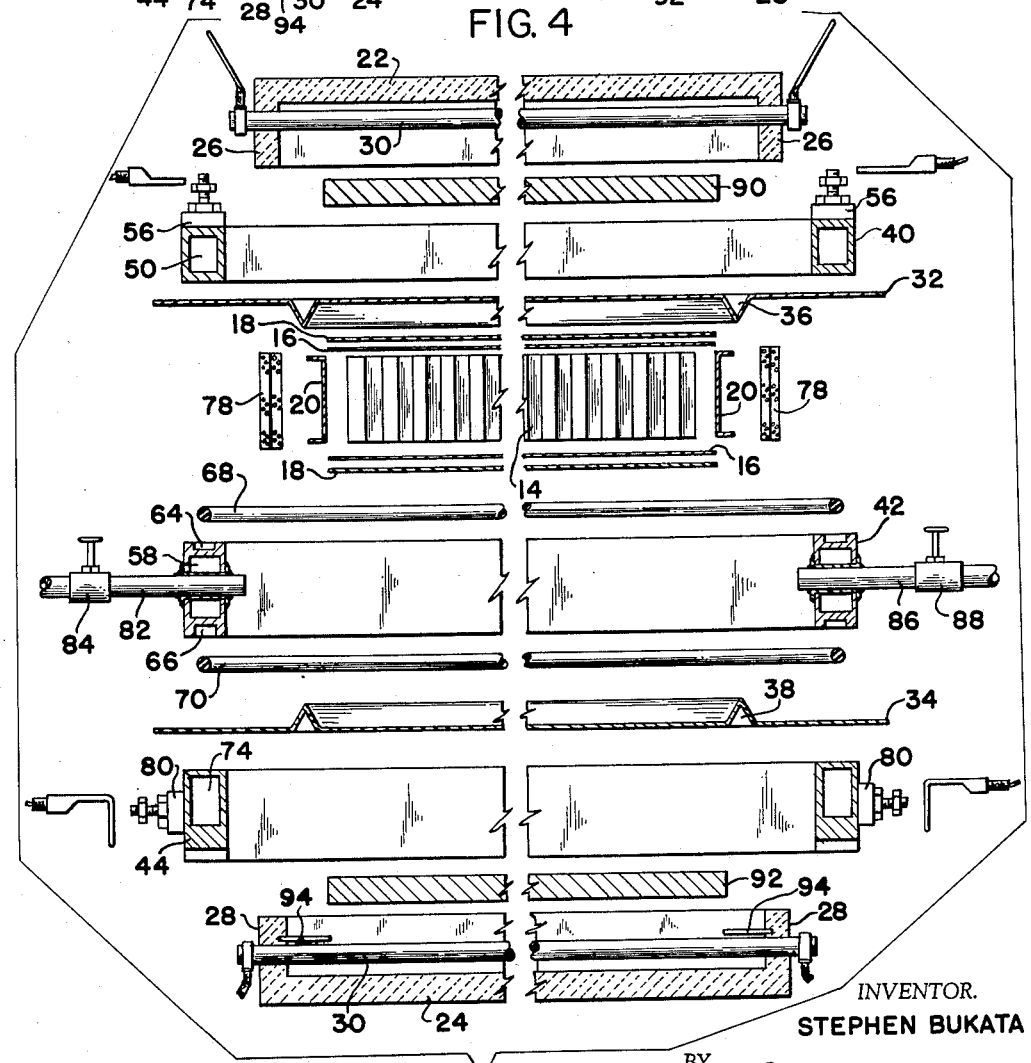
FIGURE 5 is an exploded view revealing the structure of the furnace embodiment of FIGURE 1.

Referring to the drawings, and initially to FIGURES 1 through 5, the furnace embodiment shown therein is designated generally as 10. Furnace 10 is a brazing furnace for brazing sandwich structures designated generally as 12. Such sandwich structures include a core 14, which may comprise a honeycomb core, corrugated core, waffle core, or other suitable core structures. In the illustrated embodiment the core 14 comprises a honeycomb core. The honeycomb core 14 is to be brazed by thin leaves of braze metal 16 (see FIGURE 5 for leaves of braze metal, such leaves not being shown in FIGURES 1 through 4) to cover sheets 18 and 18 and channel-shaped edge members 20. The core 14 is intermediate the cover sheets 18 and the edge members 20.

It is to be understood that the description of a sandwich structure 12 set forth above is to be taken as illustrative, and that any suitable sandwich construction may be brazed in the furnace 10 of the present invention.

The furnace 10 includes the oven top 22 and the oven bottom 24. Oven top 22 and oven bottom 24 comprise integral members, preferably formed from ceramic or other analogous kiln or furnace materials having similar high temperature characteristics. Oven top 22 and oven bottom 24 may comprise identical members formed as rectangular trays. Thus, the end walls 26 of oven top 22 and the end walls 28 of oven bottom 24 provide support for the electric heating elements 30 which raise the temperature within furnace 10 to a suitable level to effect brazing (a temperature above the melting point or solidus temperature of the braze metal 16). The electric heating elements 30 may comprise similar heating elements shaped in the form of elongated cylinders. I have found that silicon carbide cylindrical heating elements are most suitable for use in the furnaces of the present invention. In the illustrated embodiment shown in FIGURES 1 through 5, five electric heating elements 30 are illustrated. However, it is to be understood that a greater or smaller number of heating elements 30 may be provided.

A top support sheet or closure sheet 32 formed of metal having a high melting point is provided beneath oven top 22. A bottom support sheet 34, which may be of similar construction to that of top support sheet 32, is provided above oven bottom 24. Thus, top support sheet 32 may be juxtaposed to the end walls 26 of oven top 22, and bottom support sheet 34 may be juxtaposed to and supported on the end walls 28 of oven bottom 24. The support sheets 32 and 34 may comprise flat members, but preferably include respective accommodation corrugations 36 and 38 for compensating for a thermal expansion and reduction. Such accommodation corrugations 36 and 38 are positioned on support sheets 32 and 34 in the portions thereof adjacent the end walls 26 of oven top 22 (in the case of support sheet 32) and adjacent the end walls 28 of oven bottom 24 (in the case of support sheet 34).

The support sheets 32 and 34 project beyond the oven top 22 and oven bottom 24 an appreciable distance, and comprise part of the closure for the furnace 10 as described below.

Three closure members, namely top closure member 40, middle closure member 42, and bottom closure member 44 are provided for furnace 10.

The top closure member 40 comprises a generally rectangular frame having a hollow interior which may be be used as a water jacket, or jacket for other liquid coolant. Thus, referring particularly to FIGURES 1 and 3, at one corner of the top closure member 40 there is provided the liquid inlet 46 at one side of the corner and the liquid outlet 48 at the other side of the corner, with the interior hollow or jacket 50 being compartmented at the corner by the divider 52. By passing water or other liquid coolant through the jacket 50, the top closure member 40 may be maintained at a relatively low temperature notwithstanding the greatly elevated temperature within the furnace 10.

The top end surfaces 54 of top closure member 40 carry the terminal boards 56 which carry the electrical fittings for the electric heating elements 30 carried by oven top 22. The terminal boards 56 are closely adjacent the end walls 26 of oven top 22 so that the length of lead going to the electric heating elements 30 can be maintained small.

The middle closure member 42 is disposed intermediate the sheets 32 and 34, and like the top closure member 40 surrounds the furnace 10. The middle closure member 42 is provided with a hollow or jacket 58 through which water or other liquid coolant may be passed from an inlet 60 to an outlet 62 in the manner heretofore described in connection with top closure member 40.

The uppermost face of middle closure member 42 is provided with an O-ring receiving notch which extends about the entire uppermost face of the middle closure member 42. Similarly, the bottommost face of middle closure member 42 is provided with an O-ring receiving notch 66 which extends along the entire length of the bottommost face of middle closure member 42. Closed continuous O-ring 68 is received within notch 64 and a similar O-ring 70 is received within notch 66. Thus, O-ring 68 is juxtaposed to top support sheet 32, and O-ring 70 is juxtaposed to bottom support sheet 34. The O-rings 68 and 70 provide a gas-tight or air-tight seal for the portion of the furnace 10 of the present invention defined by the inside faces of support sheets 32 and 34, and the inside face of middle closure member 42.

A plurality of C-type clamps 71 engage the uppermost surface of top closure member 40 and the bottommost surface of bottom closure member 44 to effect clamping pressure so as to urge the support sheets 32 and 34 against the O-rings 68 and 70 to provide a gas-tight seal between said support sheets and said O-rings.

The bottom closure member 44 comprises a rectangular closure member analogous to top closure member 40. Thus, the bottom closure member 44 includes the inlet 72 for introducing water or other liquid coolant to the hollow or jacket 74, and outlet 76 for discharging such water or liquid coolant from the hollow or jacket 74. The internal construction of the jackets 50 of top closure member 40, 58 of middle closure member 42, and 74 of bottom closure member 44 may be identical. The tubing or piping to be secured to the inlets 46, 60, and 72, and the outlets 48, 62, and 76 should preferably comprise flexible tubing, such as rubber hose or the like. The inlets 46, 60, and 72 should be provided with individual valves to permit regulated control of the rate of flow of coolant.

The bottom support sheet 34 is supported on the bottom closure member 44. The spacing between the top support sheet 32 and the bottom support sheet 34 intermediate the accommodation corrugations 36 and 38 and the inside wall of middle closure member 42 is maintained by the spacers 78 which may comprise perforated rectangular members, or arched rectangular members. The perforations or arching of the spacers 78 is necessary so as to insure communication between the portion of the furnace which is within the spacer 78 and the portion of the furnace which is without the spacer 78. The spacer 78 maintains the distance between the top and bottom support sheets 32 and 34 at about the same distance as the height of the sandwich structure 12 so that collapse or bending of the support sheets 32 and 34 is avoided.

The bottom closure member 44 supports a terminal board 80 at each of its ends, such terminal boards 80 providing the electrical conduits and fittings for the electric heating elements 30 carried by the oven bottom 24.

A conduit 82 which may be placed in communication with a vacuum pump or other means of exhausting the interior of furnace 10 extends through the wall of middle closure member 42. The conduit 82 is provided with valve 84.

The end of middle closure member 42 opposite to the end which carries the conduit 82 may be provided with a conduit 86 and its associated valve 88. The conduit 86 may be placed in communication with a tank or other source of inert gas, such as helium or argon, in situations where it is desired that the brazing be effected in an inert gas atmosphere.

A graphite slab 90 for uniformly dissipating the heat from electric heating elements 30 is provided on top of top support sheet 32, and a graphite slab 92 which is supported on a retaining member 94 which extends inwardly from the walls of oven bottom 24 is disposed beneath bottom support sheet 34 above the electric heating elements 30. In place of a continuous member 94 a series of pins may be provided to support the graphite slab 92. The use of graphite slabs 90 and 92 insures that substantially uniform heating will be obtained intermediate the support sheets 32 and 34.

The operation of the furnace 10 of the present invention is as follows:

Loading of the furnace 10 with the core 14, leaves of braze metal 16, cover sheets 18, and channel-shaped edge members 20 is generally effected from the top, by raising the oven top 22 with top closure member 40, graphite slab 90, and top support sheet 32. When the components forming the sandwich structure 12 have been placed in position on the bottom support sheet 34, then the top support sheet 32 is placed over it. The graphite slab 90 is placed on top of the top support sheet 32, its weight insuring the downward urging of the top support sheet 32. The weight of the sandwich structure components along with graphite slab 90 insures the downward urging of the bottom support sheet 34 against the graphite slab 92.

The oven top 22 along with closure member 40 is then placed in position above the top support sheet 32. The C-type clamps 71 are then applied, a sufficient number of these clamps being used to urge the support sheets 32 and 34 against the O-rings 68 and 70 to provide a gas-tight seal as heretofore explained.

The flow of liquid coolant through the jackets 50, 58, and 74 may be used to cool the peripheral portions of the support sheets 32 and 34 and prevent heat-damage to the O-rings 68 and 70, although preferably the O-rings 68 and 70 should be formed of material which is not adversely affected by the temperatures encountered in the peripheral portions of the support sheets 32 and 34.

It is to be noted that the heating elements 30 may be provided with individual switches to permit but a small number of such heating elements 30 to be used in the case of very narrow sandwich structures, thereby effecting material savings in expenditures for electrical power.

By proper manipulation of valves 84 and 88 a constant stream of inert gas at pressures somewhat lower than atmospheric can be maintained intermediate the support sheets 32 and 34. The pressure differential between the outside atmosphere and the portion of the furnace 10 intermediate the support sheets 32 and 34 should be sufficient to maintain intimate contact between the support sheets and the sandwich construction 12, but not sufficiently great to crush the sandwich construction 12.

The accommodation corrugations 36 and 38 take up the thermal expansion encountered during the brazing operation, and take up the contraction encountered after the high temperature phase of the brazing operation has been completed.

By having the leads to the electric heating elements 30 and the tubing to the inlets and outlets of the closure members being formed of flexible materials, facile assembly and disassembly of the furnace 10 may be effected.

Figure 6:
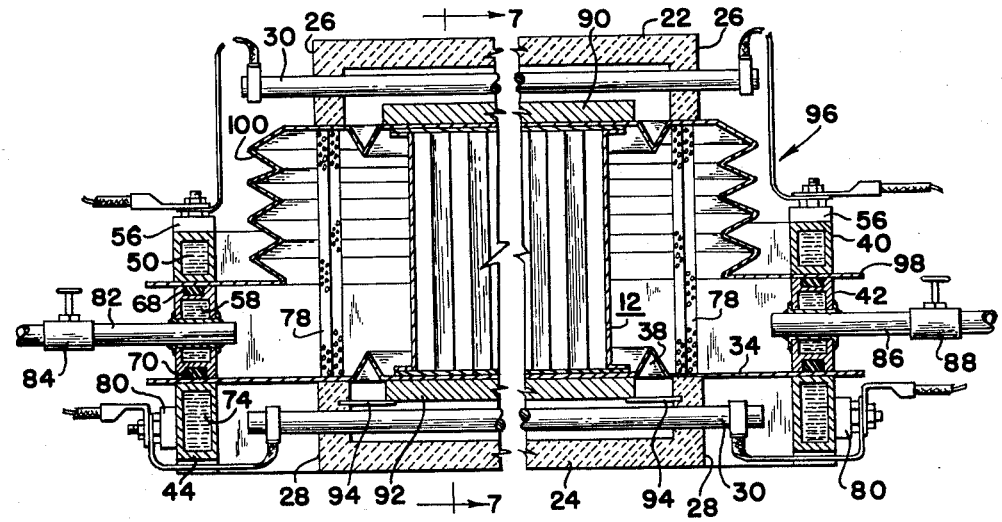
FIGURE 6 is a fragmentary longitudinal sectional view through another embodiment of the furnace of the present invention.
Figure 7:
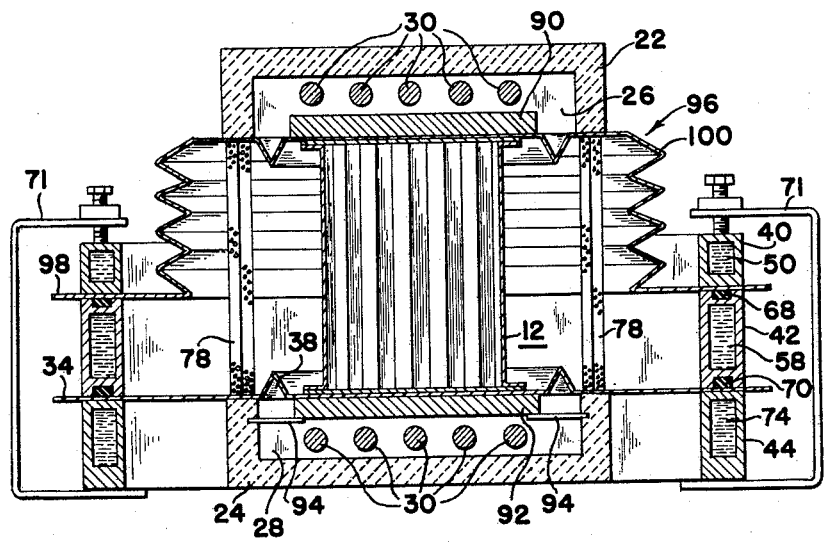
FIGURE 7 is a sectional view taken on line 7—7 of FIGURE 6.

In the embodiment of the present invention shown in FIGURES 6 and 7 the furnace 96 generally resembles the furnace 10 shown in FIGURES 1 through 5, except that in place of top support sheet 32, there is substituted the top support sheet 98. The top support sheet 98 differs from the top support sheet 32 in that the top support sheet 98 comprises a plurality of bellows-like corrugations 100 adjacent the peripheral portion thereof which is disposed intermediate top closure member 40 and middle closure member 42.

The bellows-like corrugations 100 permit the expansion of the top support sheet 98 so that it may accommodate itself to different size sandwich structures. Thus, relatively high sandwich structures, such as the sandwich structure 12 illustrated in FIGURES 6 and 7 may be brazed in the furnace 96. A variety of perforated spacers of different heights are available for the furnace 96, so that the spacers 78 of an appropriate height to match the height of the sandwich structure 12 may be utilized to support the oven top 22.

Except in respect to the modifications referred to above, the remainder of furnace 96 generally resembles the furnace 10, so that the description as to structure and as to operation which has heretofore been made for the furnace 10 will prove adequate for the furnace 96.

Furnace 10 is to be recommended when large runs of uniform size sandwich structures are to be made. Furnace 96 is to be recommended when small runs of a variety of different sizes of sandwich structures are to be made.

Figure 8:
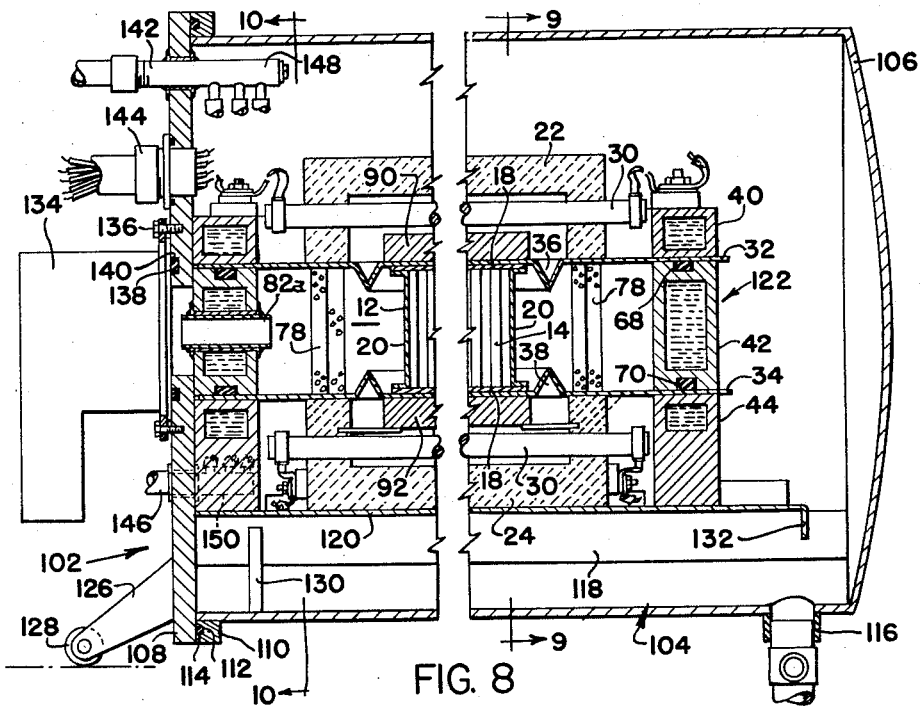
FIGURE 8 is a fragmentary longitudinal sectional view of another embodiment of the furnace of the present invention.
Figure 9:
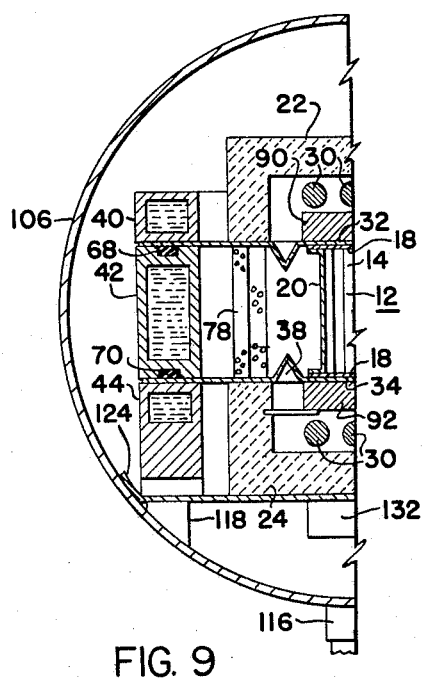
FIGURE 9 is one-half of a cross-sectional view taken on line 9—9 of FIGURE 8, the furnace embodiment shown in FIGURE 8 being symmetrical about its center line.
Figure 10:
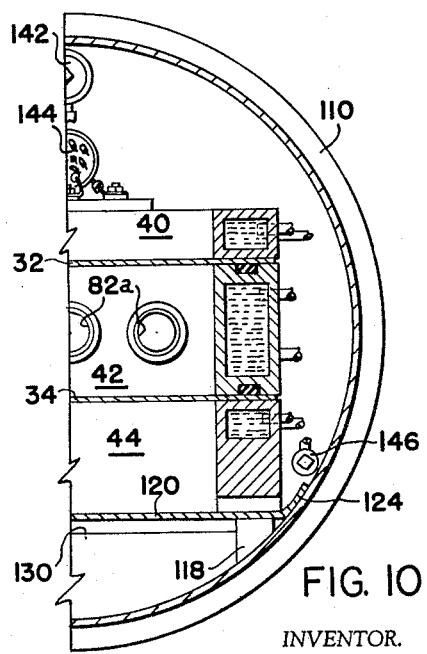
FIGURE 10 is a sectional view similar to that of FIGURE 9 but taken on line 10—10 of FIGURE 8.

The furnace embodiment 102 shown in FIGURES 8, 9 and 10 is intended for operations where maximum safeguards as to the atmospheric conditions in which the brazing is effected are necessary.

In the furnace 102, there is included the housing 104 which comprises an imperforate shell 106 which is open at but one end, namely at the end which is juxtaposed to the door 108. The shell 106 is provided with a radial flange 110 which is juxtaposed to the door 108. The flange 110 includes an O-ring receiving notch 112 within which the O-ring 114 is received. Upon the engagement of the door 108 with the O-ring 114, a gas-tight seal is secured between the door 108 and the radial flange 110.

The shell 106 is provided with a port 116. Port 116 may be gas-tightly engaged with either a gas inlet conduit or an exhaust conduit, or with a bifurcated conduit which is secured in communication with a gas inlet and exhaust means, such as a vacuum pump. Thus, the interior of shell 106 may be exhausted, and then occupied, if desired, with a suitable inert gas where the brazing requirements call for a specific atmosphere and pressure. In the embodiment 102 the pressure differential between the interior of the retort portion 122 and the interior of shell 106 can be regulated to maintain intimate contact between the support sheets and the sandwich construction without crushing the sandwich construction at high vacuums.

A pair of runners 118 are fixedly secured at the bottom sides of shell 106, the runners 118 extending for the entire length of the shell 106. Preferably, the runners comprise solid metal bars having highly finished uppermost surfaces, which surfaces form the tracks on which the mounting plate 120 which carries the retort portion 122 is slideably carried. The mounting plate 120 comprises a thick and rigid metal plate having a smooth undersurface for facile slideable engagement with the runners 118. Preferably, the ends 124 of mounting plate 120 are upwardly curved and conform to the curvature of the interior wall surface of the shell 106 to achieve facile sliding engagement with the shell 106.

A foot 126 carrying at its lowest end the wheel or roller 128 is provided on the front face of door 108. The wheel 128 engages the supporting surface, and permits the door 108 to be opened, when atmospheric pressure has been restored within the shell 106 or is present within the shell 106, and the retort portion 122 to be slid out from the shell 106. The engagement of the wheel 128 with its supporting surface and the engagement of the mounting plate 120 with the runners 118 and the ends 124 of mounting plate 120 with the interior wall of shell 106 insures the facile movement of the retort portion 122 within the shell 106. A vertically projecting stop element 130 extends upwardly from the floor of shell 106. The mounting plate 120 is provided with a dependent stop element 132. Engagement between the stop elements 130 and 132 limits the outward travel of the mounting plate 120 on the runners 118.

The door 108 carries on its outside face the vacuum pump 134, the vacuum pump 134 being bolted to the outside face of the door 108 by the bolts 136. O-ring 138 carried within the notch 140 in the front face of door 108 secures a gas-tight seal between the vacuum pump 134 and the front face of the door 108.

The door 108 is provided with a plurality of fittings, each of which is gas-tightly secured therein, namely the water or liquid coolant inlet 142, the power cable conduit 144, and the water or liquid coolant outlet 146.

The retort portion 122 may generally resemble the furnace embodiment 10 described in FIGURES 1 through 5, or the furnace embodiment 96 described in FIGURES 6 and 7. In the embodiment of the furnace 102 shown in FIGURES 8, 9 and 10, the retort portion 122 resembles the furnace 10, except for the changes set forth below.

The retort portion 122 is in communication with the vacuum pump 134 through the conduits 82a which extend through the middle closure member 42. The conduits 82a differ from the conduit 82 of furnace 10 in that it is not necessary to provide the conduits 82a with a valve.

Furthermore, no provision is necessary for a conduit in the side of middle closure member 42 opposite to the side thereof which carries the conduits 82a so that no conduit 86 is provided in the retort portion 122.

The inlets to the top closure member 40, middle closure member 42, and bottom closure member 44 comprise flexible hoses which are secured to the manifold 148 which extends from the inlet fitting 142. Similarly, the outlets of the top closure member 40, middle closure member 42, and bottom closure member 44 comprise flexible hoses which are secured to the manifold 150 which is in communication with the outlet 146 on the door 108. The electrical conduits which pass through the conduit 144 are likewise preferably flexible, and preferably comprise braided terminal straps formed of aluminum for maximum strength and flexibility.

As seen in FIGURE 8, the retort portion 122 is mounted sufficiently in front of the stop element 132, so that when the stop element 132 is engaged with the stop element 130, the retort portion 122 is disposed entirely outside of the shell 106.

Inasmuch as the remainder of the retort portion 122 may be identical to the remaining components of the furnace 10, as heretofore indicated, no further description of the retort portion 122 is necessary.

The operation of the furnace 102 is as follows:

In order to insert the components forming the sandwich structure 12 and the leaves of braze metal, the door 108 is opened and is slid away from the shell 106, the wheel 128 riding on its supporting surface and the mounting plate 120 riding on the runners 118 as has heretofore been explained. The retort portion 122 is pulled to its disposition in which it is entirely outside of the shell 106, as when the stop element 132 engages the stop element 130.

When the retort portion 122 is in its exposed disposition, the oven top 22 thereof along with closure member 40, the graphite slab 90, and the top support sheet 32 may be lifted up as has heretofore been described in connection with furnace 10. The components of the sandwich structure 12 and the braze metal leaves may then be operatively inserted in position.

The top support sheet 32, graphite slab 90, and oven top 22 along with closure member 40 may then be repositioned.

When the retort portion 122 is fully assembled, the retort pattern 122 can be slid into the shell 106 by moving the door 108 towards the mouth of the shell 106. Upon the engagement of the door 108 with the juxtaposed face of the radial flange 110 a gas-tight seal will be obtained between the door 108 and the radial flange 110 due to the provision of the O-ring 114.

The shell 106 and the retort portion 122 can then be exhausted, the exhaustion of the shell 106 being effected through the port 116, and the exhaustion of the retort portion 122 being effected through the conduits 82a which are in communication with the vacuum pump 134.

If desired, means may be provided in conjunction with the vacuum pump 134 for introducing a desired inert gas into the interior of the retort portion 122, simultaneously with the introduction of the same inert gas into the interior of shell 106 through the port 116.

Where gas is introduced into the interior of shell 106, it may be desirable to provide clamping means to secure positive engagement between the door 108 and the flange 110 in the relatively rare situations where the pressure of gas within the shell 106 exceeds atmospheric pressure.

The furnace construction of the present invention permits brazing to be done under closely controlled conditions without the necessity of resorting to sealed envelopes. Thus, the furnace of the present invention enables panels comprising sandwich structures to be brazed far more rapidly and cheaply than was possible by the use of means heretofore used for that purpose.

The present invention may be embodied in other specific forms without departing from the spirit or essential attributes thereof and, accordingly, reference should be made to the appended claims, rather than to the foregoing specification as indicating the scope of the invention.

I claim:

1. In a furnace comprising top and bottom sections, a pair of impervious envelope sheets mounted intermediate said top and bottom sections, each of said sheets cooperating with each of said sections to form top and bottom heating chambers, means in each of said heating chambers for uniformly heating the space between said sheets, the peripheral portions of said sheets projecting appreciably beyond the sides of said top and bottom sections, a rigid closure member intermediate said peripheral portions of said sheets, a conduit extending through said rigid closure member, said conduit communicating with the space between said sheets, seal means between said closure member and each sheet, said rigid closure member having a coolant passage therethrough for receiving a coolant liquid adapted to cool said seal means, and means clamping said peripheral portions of said sheets against the said seal means thereby providing an airtight joint between said rigid closure member and said sheets.

2. In a furnace comprising top and bottom sections, a pair of impervious envelope sheets mounted intermediate said top and bottom sections, each of said sheets cooperating with each of said sections to form top and bottom heating chambers, means in each of said chambers for uniformly heating the space between said sheets, the peripheral portions of said sheets projecting appreciably beyond the sides of said top and bottom sections, a rigid closure member intermediate said peripheral portions of said sheets, seal means between said rigid closure member and each sheet, a conduit extending through said rigid closure member, said conduit communicating with the space between said sheets, said conduit being adapted to be connected to a vacuum pump for evacuating the space between said sheets, the height of said rigid closure member being substantially identical with the distance between central portions of said sheets, said rigid closure member having a coolant passage therethrough for receiving a coolant liquid adapted to cool said seal means, and means clamping said peripheral portions of said sheets against said seal means thereby providing an airtight joint between said rigid closure member and said sheets.

3. In a furnace comprising top and bottom sections, a pair of impervious envelope sheets mounted intermediate said top and bottom sections, each of said sheets cooperating with each of said sections to form top and bottom heating chambers, means in each of said chambers for uniformly heating the space between said sheets, the peripheral portions of said sheets projecting appreciably beyond the sides of said top and bottom sections, a rigid closure member intermediate said peripheral portions of said sheets, seal means between said rigid closure member and each sheet, means clamping said peripheral portions of said sheets against said gasket seal means thereby providing an air-tight joint, said rigid closure member having a coolant passage therethrough for receiving a coolant liquid adapted to cool said seal means, means defining a flow passage through said rigid closure member, said flow passage having one end in communication with the space between said sheets, the other end of said flow passage being adapted to be connected to a vacuum pump for evacuating the space between said sheets, an air-tight shell disposed about said top and bottom sections, access means for selectively achieving access to the interior of said shell, and means defining a flow passage through said shell, said flow passage having one end in communication with the space within said shell, the other end of said shell flow passage being adapted to be connected to a vacuum pump for evacuating the space within said shell to a pressure slightly greater than the pressure within said envelope sheets.

References Cited in the file of this patent

UNITED STATES PATENTS

| | | |
|---|---|---|
| 942,513 | Palmer | Dec. 7, 1909 |
| 1,137,293 | Schonemann | Apr. 27, 1915 |
| 1,438,936 | Eimer | Dec. 12, 1922 |
| 2,016,914 | Van Nordstrand | Oct. 8, 1935 |
| 2,128,305 | Lambert | Aug. 30, 1938 |
| 2,163,566 | Blessin | June 20, 1939 |
| 2,678,958 | Hintenberger | May 18, 1954 |
| 2,700,632 | Ackerlind | Jan. 25, 1955 |
| 2,745,172 | Townsend | May 15, 1956 |
| 2,796,510 | Herbert | June 18, 1957 |
| 2,803,449 | Ludwig | Aug. 20, 1957 |
| 2,845,698 | Giovannucci et al. | Aug. 5, 1958 |
| 2,853,408 | Stengel | Sept. 23, 1958 |
| 2,912,476 | Aschoff | Nov. 10, 1959 |
| 2,926,761 | Herbert | Mar. 1, 1960 |
| 2,956,099 | Raynes | Oct. 11, 1960 |
| 2,979,005 | Herbert | Apr. 11, 1961 |
| 2,984,732 | Herbert | May 16, 1961 |

FOREIGN PATENTS

| | | |
|---|---|---|
| 1,162,692 | France | Apr. 14, 1958 |

OTHER REFERENCES

Vacuum Metallurgy, Rointan F. Bunshas, Reinhold Publishing Corp., New York, N.Y., page 248.